United States Patent
Zurlo

Patent Number: 5,816,047
Date of Patent: Oct. 6, 1998

[54] ELECTRONICALLY CONTROLLED WASTEGATE VALVE FOR A TURBO CHARGER

[75] Inventor: James R. Zurlo, Shorewood, Wis.

[73] Assignee: Dresser Industries, Inc., Dallas, Tex.

[21] Appl. No.: 707,009

[22] Filed: Sep. 3, 1996

[51] Int. Cl.⁶ .................................................. F02B 37/12
[52] U.S. Cl. ................................................................ 60/602
[58] Field of Search .................................... 60/600–603

[56] References Cited

U.S. PATENT DOCUMENTS

| | | | |
|---|---|---|---|
| 3,195,805 | 7/1965 | Cholvin et al. | 230/9 |
| 3,257,796 | 6/1966 | Updike | 60/13 |
| 3,941,035 | 3/1976 | Mueller | 92/49 |
| 4,005,578 | 2/1977 | McInerney | 60/602 |
| 4,005,579 | 2/1977 | Lloyd | 60/602 |
| 4,424,675 | 1/1984 | Ojima | 60/602 |
| 4,449,367 | 5/1984 | Moriguchi et al. | 60/602 |
| 4,459,809 | 7/1984 | Tadokoro et al. | 60/602 |
| 4,468,928 | 9/1984 | Suzuki | 60/602 |
| 4,528,816 | 7/1985 | Arnaud | 60/602 |
| 4,548,038 | 10/1985 | Matsuki | 60/602 |
| 4,612,900 | 9/1986 | Iwata et al. | 123/425 |
| 4,651,561 | 3/1987 | Ueno et al. | 73/115 |
| 4,656,834 | 4/1987 | Elpern | 60/602 |
| 4,763,475 | 8/1988 | Toshio et al. | 60/602 |
| 4,848,086 | 7/1989 | Inoue et al. | 60/602 |
| 4,970,864 | 11/1990 | Kazuo et al. | 60/602 |
| 5,036,669 | 8/1991 | Earleson et al. | 60/602 |
| 5,083,434 | 1/1992 | Dahlgren et al. | 60/602 |
| 5,119,633 | 6/1992 | Brooks et al. | 60/624 |
| 5,142,868 | 9/1992 | Woon et al. | 60/624 |
| 5,155,998 | 10/1992 | Monden | 60/602 |
| 5,199,261 | 4/1993 | Baker | 60/612 |
| 5,214,919 | 6/1993 | Jiewertz et al. | 60/602 |
| 5,224,853 | 7/1993 | Kazuo et al. | 60/602 |
| 5,228,292 | 7/1993 | Hanauer et al. | 60/602 |
| 5,271,228 | 12/1993 | Kawakami | 60/602 |
| 5,289,683 | 3/1994 | Kurihara | 60/602 |
| 5,400,597 | 3/1995 | Mirabile | 60/606 |
| 5,408,979 | 4/1995 | Backlund et al. | 123/562 |
| 5,442,920 | 8/1995 | Kamel et al. | 60/602 |
| 5,454,225 | 10/1995 | Sumser et al. | 60/602 |

*Primary Examiner*—Michael Koczo
*Attorney, Agent, or Firm*—Andrus, Sceales, Starke & Sawall

[57] ABSTRACT

An electronically controlled wastegate valve is adjusted so that the pressure drop across a throttle in the engine approaches an adaptively generated, desired throttle pressure reserve value. The desired throttle pressure reserve value is based at least in part on a history of the engine load. In the preferred embodiment, the engine speed is used as a surrogate for engine load to determine the desired throttle pressure reserve value. The desired throttle pressure reserve value is preferably pushed downward over time by use of a constant negative gain term in the electronic controller. In this manner, the wastegate control provides sufficient throttle pressure reserve for satisfactory load acceptance when engine load is fluctuating, yet minimizes throttle pressure reserve to improve engine fuel consumption when the engine load is relatively steady.

21 Claims, 3 Drawing Sheets

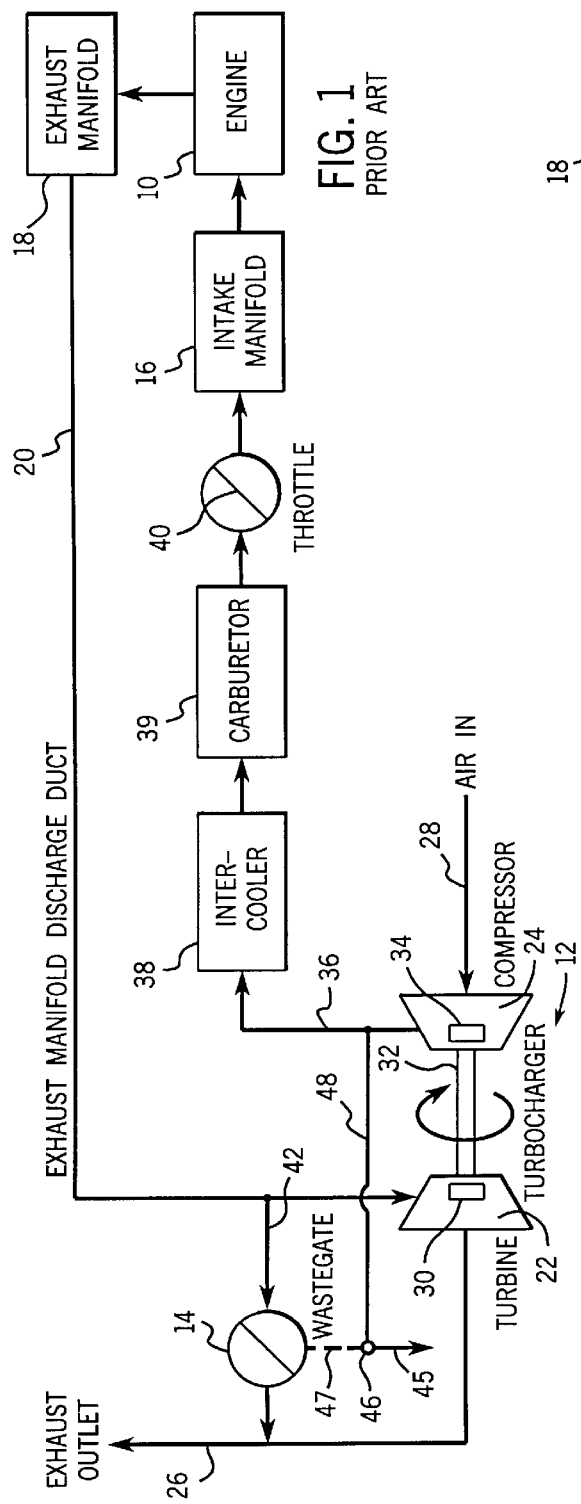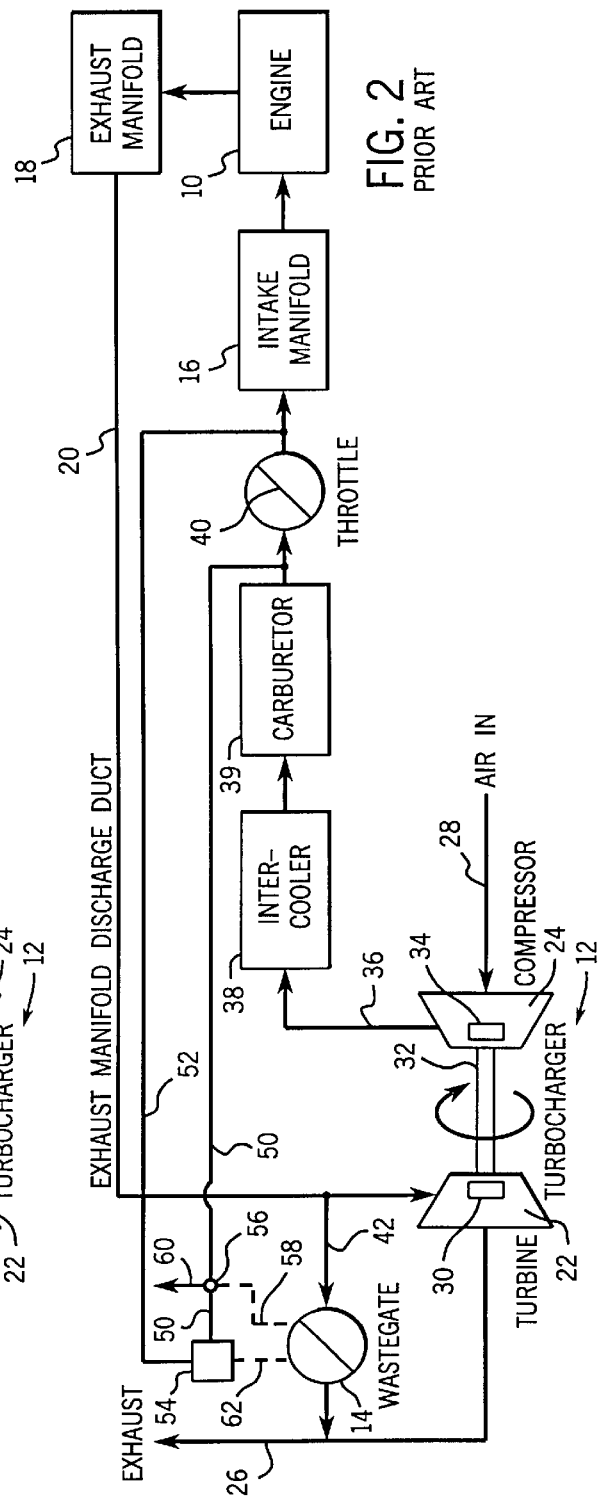

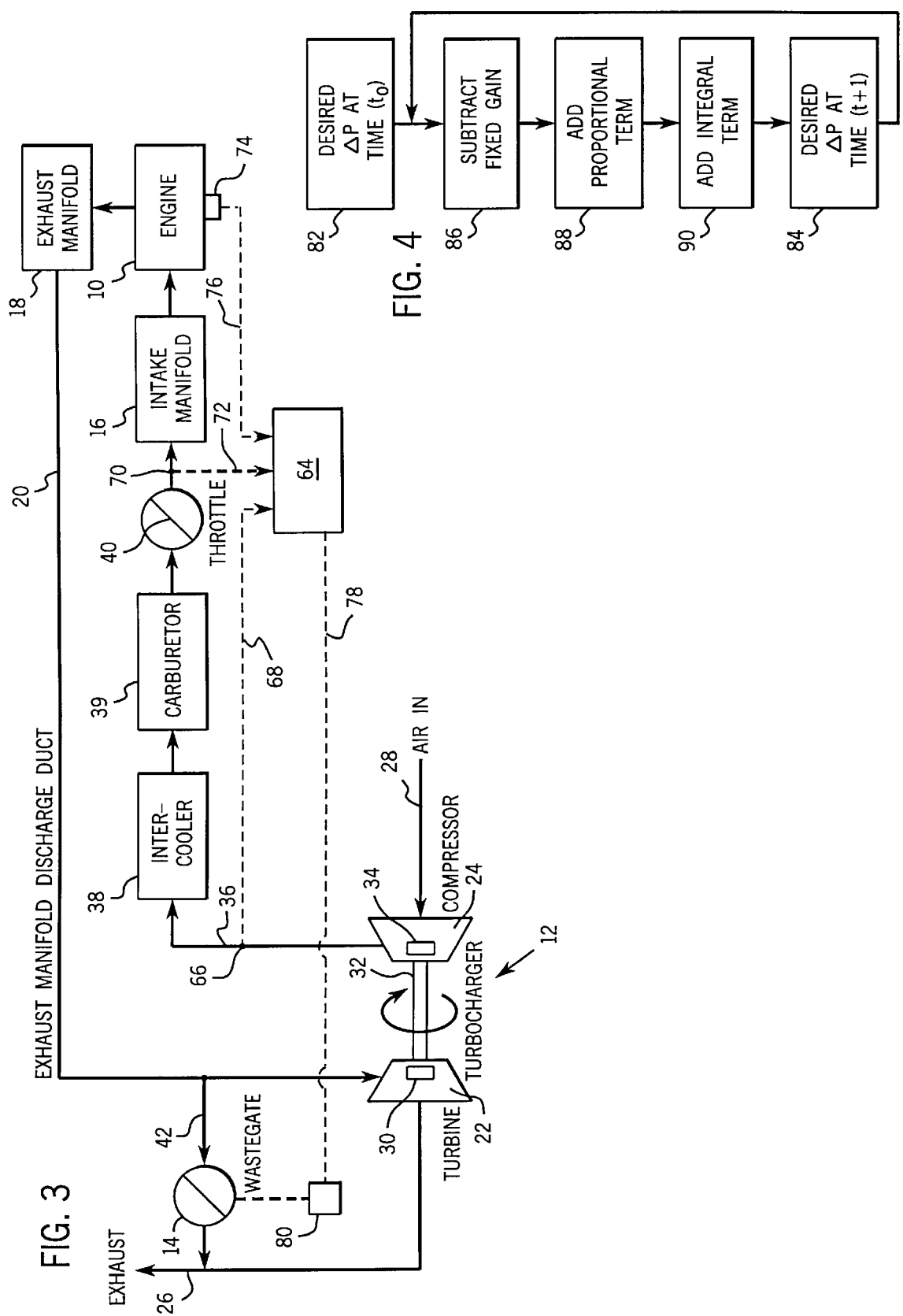

ELECTRONICALLY CONTROLLED WASTEGATE VALVE FOR A TURBO CHARGER

FIELD OF THE INVENTION

The invention relates to an electronically controlled wastegate valve on a turbocharged internal combustion engine. In particular, the invention relates to a control system and method that adaptively adjusts the throttle pressure reserve to improve load acceptance when the load on the engine is fluctuating, and optimize engine efficiency when the load on the engine is relatively steady.

BACKGROUND OF THE INVENTION

The invention is primarily directed to large industrial internal combustion engines that are fueled by natural gas, and are intended to operate for long periods, and are capable of generating thousands of horsepower. These large engines are typically used for generating electrical power, pumping natural gas and oil, or powering offshore well drilling operations, and so on.

The invention applies to turbocharged internal combustion engines having a wastegate valve. A turbocharger includes a turbine and a compressor. In a turbocharged engine, exhaust drives a turbine wheel in the turbine, which in turn drives a shaft connected to a compressor wheel in the compressor. The exhaust exiting the turbocharger discharges through an exhaust outlet duct. The compressor typically pressurizes or turbocharges ambient air, and forces the pressurized intake air through an intercooler and a carburetor (or other fuel addition device such as electronic fuel injection), past a throttle valve, and into an engine intake manifold. In some systems, the carburetor is located upstream of the compressor so the compressor pressurizes a mixture of fuel and air.

Exhaust discharges from the engine through an engine exhaust manifold, and is directed through an exhaust manifold discharge duct to the turbine of the turbocharger. A wastegate valve is often provided to divert some or all of the engine exhaust energy away from the turbine of the turbocharger. Usually, the wastegate valve is located within a passage between the exhaust manifold discharge duct and the exhaust system outlet duct.

Using a standard wastegate control otherwise known as a maximum boost regulator, the wastegate valve remains closed until the pressure of the pressurized intake air from the compressor becomes large enough to actuate a spring mechanism in the wastegate actuator to open the wastegate valve. The system thus diverts engine exhaust away from the turbine in the turbocharger when the compressor discharge pressure reaches a maximum boost value. In such a maximum boost system, the wastegate valve remains closed at light loads and continues to remain closed until the engine reaches about 80% to 90% of full load. Even when the throttle is fully open in a maximum boost system, opening the wastegate valve will reduce the amount of energy supplied to the turbine in the turbocharger, and in turn will maintain the compressor discharge pressure at the maximum boost value.

It is known in the art to use a fixed ΔP wastegate control in conjunction with a maximum boost regulator. In a fixed ΔP wastegate control, the wastegate valve is adjusted to maintain a fixed pressure reserve across a throttle (i.e. a fixed pressure drop across the throttle at light or medium engine loads). Compared to the standard wastegate control using only a maximum boost regulator, the fixed ΔP wastegate control tends to improve engine efficiency at light and medium loads due to reduced exhaust pressure and the associated pumping losses. The maximum boost regulator in a fixed ΔP wastegate control operates in a similar manner to the standard wastegate control to limit the maximum compressor discharge pressure.

In a fixed ΔP wastegate control, the throttle pressure reserve can be monitored mechanically using a pressure tap upstream of the throttle and another pressure tap downstream of the throttle. The pressure difference between the pressure taps typically drives a spring actuated wastegate valve actuator. Alternatively, the throttle pressure reserve can be determined electronically by sensing the pressure both upstream and downstream of the throttle, and subtracting the two sensed pressures electronically to determine a pressure difference across the throttle.

Large industrial internal combustion engines typically operate at a fixed speed, but the load on the engine varies. If there is a large increase in the load, the throttle on the engine opens and the pressure difference across the throttle drops, which provides an initial increase in engine power output. In other words, the throttle pressure reserve provides the initial increase in engine power output. The remaining increase in power output is due to the fact that the turbocharger will continually speed up as the wastegate remains closed. The wastegate will remain closed until the throttle pressure reserve (i.e. the pressure drop across the throttle) recovers. It takes a relatively long time (e.g. 5 seconds) for the turbocharger to speed up and for the pressure drop across the throttle to recover completely. In large industrial internal combustion engines having a fixed ΔP wastegate control, the desired throttle pressure reserve is normally chosen to compromise between reasonable fuel consumption and yet maintaining satisfactory load acceptance.

With a fixed ΔP wastegate control, engine efficiency can be improved by maintaining a low pressure drop across the throttle, but the load acceptance of the engine is reduced. A higher throttle pressure reserve permits the engine to accept greater loads at constant speed or to accelerate a constant load upon the opening of the throttle without hesitation due to the lack of intake manifold pressure. However, to obtain optimum engine efficiency, it is desired to maintain the throttle in an open position thus reducing the throttle pressure reserve and the load acceptance of the engine. There is therefore a trade-off between engine response and fuel consumption.

It can be appreciated that it would be desirable to maintain a relatively small throttle pressure reserve to improve engine efficiency when the load on the engine is relatively stable, yet maintain a relatively large throttle pressure reserve to improve engine load acceptance when the load on the engine fluctuates. In U.S. Pat. No. 5,551,236, Application Ser. No. 08/236,467, entitled "Turbocharger Control Management System", and assigned to the assignee of the present application, discusses a fixed ΔP wastegate control system in connection with an electronic controller. In that application, it is suggested that the desired throttle pressure reserve can be adjusted depending on a desired load response of the engine which is mapped into the controller depending on various conditions. However, even with the system in the above referenced application, it is difficult to predict when the throttle pressure reserve should be large and when the throttle pressure reserve should be small.

SUMMARY OF THE INVENTION

The invention provides an adaptive wastegate control in which the desired throttle pressure reserve, or ΔP set point, is determined depending upon the history of the engine load, or the history of some other factor such as engine speed or intake manifold absolute pressure which can give an indication of engine load. In this manner, the invention can provide a large throttle pressure reserve when the engine load is fluctuating, thus improving the engine response to load changes, and a smaller throttle pressure reserve when the engine load is relatively stable, thus improving fuel consumption.

In particular, the preferred embodiment of the invention involves the use of an electronic controller that receives a signal from a pressure transducer located upstream of the throttle, a signal from another pressure transducer located downstream of the throttle, and an engine load signal from an engine load sensor. The electronic controller generates a wastegate control signal that instructs a wastegate actuator to close or to open the wastegate valve. The electronic controller adaptively generates a desired throttle pressure reserve value that depends at least in part upon the prior history of the engine load. If the pressure drop across the throttle, as determined from signals from the upstream and downstream pressure transducer, is greater than the desired throttle pressure reserve value, the electronic controller generates a wastegate control signal instructing the wastegate valve to open. If the pressure drop across the throttle is less than the desired throttle pressure reserve value, the electronic controller instructs the wastegate actuator to close the wastegate valve. Since the desired throttle pressure reserve value depends at least in part on the history of the engine load, the electronic controller can provide a relatively large throttle pressure reserve for fluctuating loads to improve load acceptance, and can provide a relatively low throttle pressure reserve to improve fuel consumption when the loads are relatively steady.

It is preferred that the desired throttle pressure reserve value be consistently driven downward, thus improving engine efficiency or fuel consumption absent a significant fluctuation in the engine load to drive the desired pressure reserve value upward. This can be accomplished in the electronic controller by applying a constant negative gain term, as well as engine load terms, in a loop update scheme.

The invention does not require that this type of adaptive scheme be used over all ranges of engine load. For instance, in industrial electrical power applications, engine efficiency at light engine loads is relatively unimportant, so it may be desirable to set the throttle pressure reserve at a high level for light loads, and use an adaptive scheme to improve engine efficiency at higher loads only.

Engine load can be monitored in several ways, and the invention is not intended to be limited to any one of these particular ways for monitoring engine load. One practical way for monitoring change in engine load is to monitor engine speed such as with an engine rpm sensor. Engine speed change is a fairly good surrogate for engine load change especially in large industrial applications.

It can therefore be appreciated that the invention can readily achieve its primary objective of allowing large industrial internal combustion engines to improve fuel consumption at steady loads, yet provide sufficient throttle pressure reserve for satisfactory load acceptance when the load on the engine is fluctuating.

Other objects and advantages of the invention should become apparent to those skilled in the art upon reviewing the following drawings and description thereof.

BRIEF DESCRIPTION OF THE DRAWINGS

Prior Art

FIG. 1 is a schematic drawing illustrating a turbocharged internal combustion engine with a standard wastegate control as is known in the art.

FIG. 2 is a schematic drawing illustrating a turbocharged internal combustion engine having a fixed ΔP wastegate control as is known in the art.

Present Invention

FIG. 3 is a schematic drawing illustrating a turbocharged internal combustion engine having an adaptive ΔP wastegate control in accordance with the invention.

FIG. 4 is a flowchart illustrating the preferred scheme for continuously adjusting the desired throttle pressure reserve for the system shown in FIG. 3.

Figure 5A:
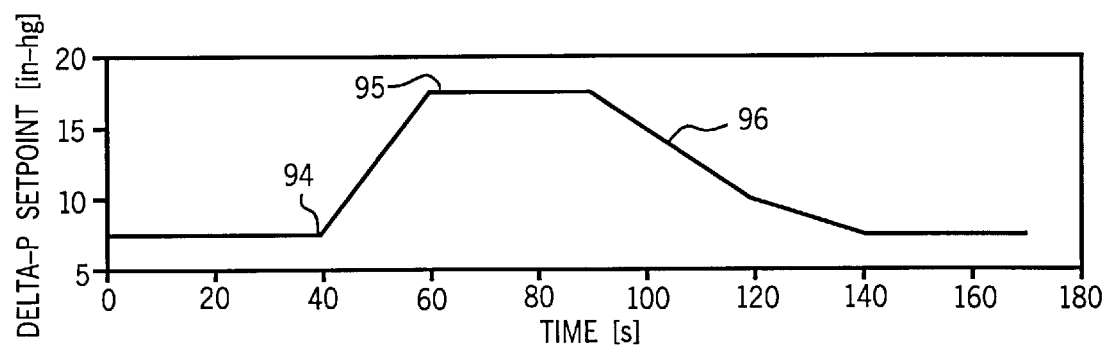
Figure 5B:
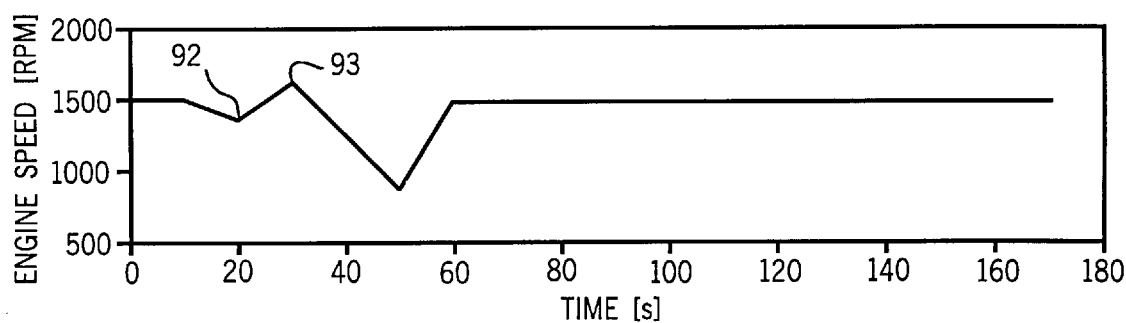
Figure 5C:
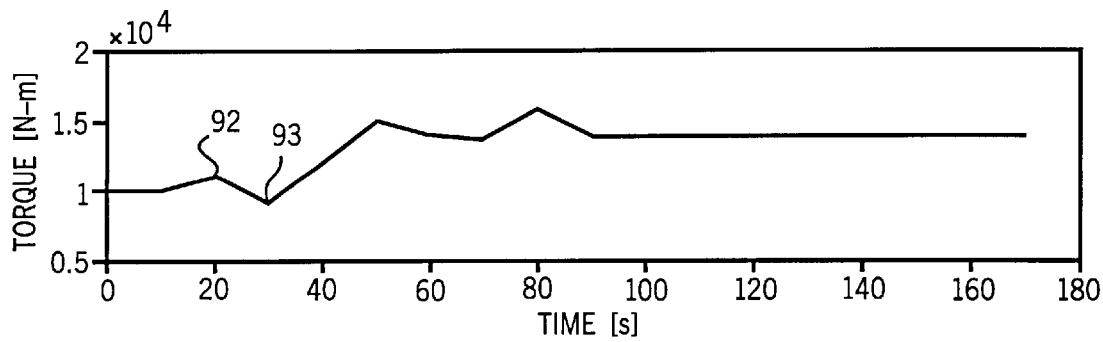

FIGS. 5a through 5c are graphs plotting the ΔP set point, engine speed, and engine torque versus time, which depict the response of the adaptive ΔP wastegate control shown in FIGS. 3 and 4 with respect to changes in engine load.

DETAILED DESCRIPTION OF THE DRAWINGS

Prior Art

FIGS. 1 and 2 schematically illustrate two versions of a large industrial internal engine systems 10 having a turbocharger 12 and a wastegate valve 14 which are controlled in a manner known in the art. In particular, FIG. 1 illustrates a system with a standard wastegate control otherwise known as a maximum boost regulator, and FIG. 2 illustrates a system with a fixed ΔP control (i.e. a fixed throttle pressure reserve control).

In FIG. 1, an engine 10 includes an intake manifold 16 and an exhaust manifold 18. Exhaust discharges from the exhaust manifold 18 through an exhaust manifold discharge duct 20, and flows to the turbocharger 12. The turbocharger includes a turbine 22 and a compressor 24. The engine exhaust passes through the turbocharger 12 into an exhaust outlet duct 26.

Ambient air inputs the compressor 24 through an air intake duct 28. An air cleaner (not shown) is normally located in the air intake duct 28. Since the ambient air inputting the compressor 24 is drawn through an air cleaner, the air in intake duct 28 is normally under a partial vacuum. Energy in the exhaust gases flowing through the turbine 22 drives a turbine wheel 30, which in turn drives a shaft 32 to drive a compressor wheel 34. The compressor wheel 34 compresses (i.e. pressurizes, turbocharges, or boosts) the ambient air flowing to the compressor 24 through air intake duct 28, and pressurized intake air outputs the compressor 24 in compressor discharge duct 36. The pressurized air in compressor discharge duct 24 is forced through an intercooler 38 that functions as a heat exchanger to remove excess heat from the turbocharged intake air. The turbocharged intake air is then channeled through a carburetor 39, a throttle 40, and the intake manifold 16 to engine 10.

The carburetor 39 is typically located between the intercooler 38 and the throttle 40. Fuel is mixed with the compressed air within the carburetor 39, and the fuel-air mixture then flows to the throttle 40. In large industrial internal combustion engines, the fuel is typically natural gas, although other fuels can be used. Alternatively, the carburetor 39 can be located upstream of the compressor 24 in the air intake duct 28. In such a configuration, the compressor 24 for the turbocharger 12 compresses the airfuel mixture in duct 28 and discharges the pressurized air-fuel mixture in the compressor discharge duct 36.

The throttle 40 creates a pressure drop such that the air pressure into the throttle 40 is at the compressor discharge pressure or slightly below, and the air pressure downstream of the throttle 40 is at the intake manifold pressure. The amount of the pressure drop across the throttle 40 is referred to as the throttle pressure reserve. The throttle pressure reserve, or the amount of pressure drop across the throttle, depends both on the air flow through the throttle 40 and the position of the throttle 40.

A wastegate passage 42 is provided between the exhaust manifold discharge duct 20 from the exhaust manifold 18 and the exhaust outlet duct 26 from the turbine 22 of the turbocharger 12. A wastegate valve 14 is located within the wastegate passage 42 to regulate the amount of energy in the engine exhaust bypassing the turbine 22 of the turbocharger 12. When the wastegate valve 14 is partially or fully open, engine exhaust in the exhaust manifold discharge duct 20 is diverted to the exhaust outlet duct 26, thereby decreasing the exhaust mass flow to the turbine 22 in the turbocharger 12. Decreasing the exhaust mass flow to the turbine 22 reduces the output of the compressor 24, and in turn lowers the compressor discharge pressure in compressor discharge duct 36.

The prior art standard wastegate control shown in FIG. 1 is a maximum boost regulator and includes a wastegate valve actuator 46 and a pressure tap 48. The pressure tap 48 typically monitors the pressure in the compressor discharge duct 36 upstream of the throttle 40. While FIG. 1 shows the pressure tap 48 monitoring the pressure in the compressor discharge duct 36 between the intercooler 38 and the compressor 34, it is also known to monitor the air pressure in the compressor discharge duct 36 between the throttle 40 and the intercooler 38.

The pressure tap 48 is connected to a spring actuated wastegate valve actuator 46. The actuator 46 controls the wastegate valve 14 as illustrated schematically by line 47. In the particular embodiment shown in FIG. 1, the wastegate valve 14 will remain closed until the pressure in the compressor discharge duct 36 and the pressure tap 48 is sufficient to actuate the spring loaded actuator 46. Line 45 from the wastegate valve actuator 46 is open to ambient conditions and is shown to indicate that the actuator 46 actuates wastegate valve 14 depending on the difference of the pressure in line 48 above the ambient pressure in line 45. This type of standard wastegate control, or maximum boost regulator, serves to limit the operation of the compressor 24 when the engine is running at high loads such as 80% to 90% of maximum total load. The prior art system of FIG. 1 therefore limits maximum output of the engine 10 by limiting the output or boost of the compressor 24 in the turbocharger 12.

Although FIG. 1 depicts a mechanical configuration for the standard wastegate control, electronic schemes using a pressure transducer for measuring the pressure in the compressor discharge duct 36 are known in the art.

While the pressure tap 48 is shown in FIG. 1 to monitor the pressure in the compressor discharge duct 36 upstream of the throttle 40, the pressure tap 48 can alternatively monitor the intake manifold pressure 16 downstream of the throttle 40, without significantly affecting the operation of the maximum boost regulator 46. This is because the throttle 40 will normally be fully open, or almost fully open, when the engine 10 is operating at high loads. Under such maximum boost conditions, the pressure downstream of the throttle 40 will be substantially the same or slightly less than the pressure upstream of the throttle 40.

FIG. 2 depicts a fixed ΔP wastegate control as is known in the art. Besides the wastegate control, the system shown in FIG. 2 is similar to the system shown in FIG. 1, and like reference numerals are used in FIG. 2 where appropriate. The fixed ΔP wastegate control shown in FIG. 2 includes an upstream pressure tap 50 for monitoring the pressure in the compressor discharge duct 36 upstream of the throttle 40, and a downstream pressure tap 52 for monitoring the intake manifold pressure downstream of the throttle 40. As described with respect to the system shown in FIG. 1, the upstream pressure tap 50 can be located in the compressor discharge duct 36 between the intercooler 38 and the compressor 34, or alternatively between the intercooler 38 and the throttle 40.

The upstream pressure tap 50 communicates with a fixed ΔP wastegate valve actuator 54 as does the downstream pressure tap 52. A boost regulator 56 is placed in the upstream pressure tap 50, or can alternatively be placed in the downstream pressure tap 52. The boost regulator 56 operates similar to the boost regulator 46 described in FIG. 1, and functions to open the wastegate valve 14 as illustrated schematically by line 58 when the pressure in the pressure tap 50, or alternatively line 52, exceeds a threshold value to control the maximum output of the compressor 24 normally at 80% to 90% of the maximum engine load. Line 60 from the maximum boost regulator 56 is open to ambient conditions and is shown to indicate that the boost regulator 56 actuates the wastegate valve 14 depending on the difference of the pressure in line 50 (or alternatively line 52) above ambient pressure in line 60.

The fixed ΔP wastegate actuator 54 operates to control the wastegate valve 14 as illustrated schematically by line 62 when the engine is operating at partial load in order to maintain a fixed pressure difference between pressure taps 50 and 52. In other words, the fixed ΔP wastegate actuator 54 operates to maintain a fixed throttle pressure reserve. In particular, the fixed ΔP wastegate actuator 54 opens wastegate valve 14 at light or medium engine loads when the compressor discharge pressure monitored by the upstream pressure tap 50 exceeds the intake manifold pressure monitored by the downstream pressure tap 52 more than a selected throttle pressure reserve, or ΔP set point. For a fixed ΔP wastegate control typically has a ΔP set point or desired throttle pressure reserve of about 9 inches of mercury (4 psi) for steady loads, and a ΔP set point of 13 inches of mercury (6 psi) for fluctuating loads.

Although FIG. 2 depicts a mechanical configuration for a fixed ΔP wastegate control, electronic schemes using an upstream pressure transducer for sensing the compressor discharge pressure and a downstream pressure transducer for measuring the intake manifold pressure are known in the art. One such disclosure is discussed in the aforementioned U.S. Pat. No. 5,551,236, application Ser. No. 08/236,467, entitled "Turbocharger Control Management System", assigned to the assignee of the present application, which is herein incorporated by reference. In such a system, the throttle pressure reserve can be determined electronically by sensing the pressure both upstream and downstream of the throttle, and subtracting the two sensed pressures electronically. As mentioned above, this application suggests that the desired throttle pressure reserve can be adjusted depending on a desired load response of the engine which can be mapped into an electronic controller depending on various conditions.

PRESENT INVENTION

FIG. 3 schematically illustrates a large industrial internal engine system 10 having a turbocharger 12 and a wastegate valve 14 that is controlled in accordance with the invention.

Besides the wastegate control, the system shown in FIG. 3 is similar to the system shown in FIGS. 1 and 2, and like reference numerals are used in FIG. 3 where appropriate. In the invention, an electronic controller 64 is used to adaptively generate a desired throttle pressure reserve value so that load response is improved when the engine load is fluctuating, and fuel consumption is improved when engine load is relatively steady.

In the preferred embodiment of the invention, an upstream pressure sensor 66 monitors the pressure in the compressor discharge duct 36, and generates an upstream pressure signal in response thereto. The upstream pressure signal is transmitted to the electronic controller 64 through line 68. The upstream pressure signal is preferably an analog signal such as a 0–5 volt signal or a 4–20 milliamp signal. A downstream pressure transducer 70 senses the intake manifold pressure, and generates a downstream pressure signal in response thereto. The downstream pressure signal is transmitted to the electronic controller 64 through line 72. The downstream pressure signal is also preferably an analog signal, such as a 0–5 volt signal or a 4–20 milliamp signal.

An engine load sensor 74 monitors the engine load, and generates an engine load signal in response thereto. The engine load signal is transmitted to the electronic controller 64 through line 76. The engine load sensor 74 can generally be any type of sensor that senses some characteristic of the operation of the engine 10 from which the engine load can be determined or inferred. For instance, in a system where the engine 10 drives an electric generator, the engine load can be measured directly by measuring the electrical power output from the generator using a watt transducer or the like. Another common way of inferring changes in engine load would be to monitor the intake manifold absolute pressure using a manifold absolute pressure sensor on the intake manifold 16. The preferred way of monitoring the change in engine load is to monitor engine speed preferably using an engine rpm sensor, and generating an engine rpm signal which is transmitted to the electronic controller. Engine speed change is a practical and reliable surrogate for engine load change in applications involving large industrial internal combustion engines because fluctuations in engine speed indicate that there has been a fluctuation in engine load. A suitable type of rpm sensor is the type of sensor using a magnetic pick-up to generate a signal based on the frequency of engine revolutions.

The electronic controller 64 adaptively generates a desired throttle pressure reserve based not only on the current engine load signal, but also based on previous engine load signals. If the electronic controller 64 determines that the engine load is fluctuating, the electronic controller 64 will set the desired throttle pressure reserve value at a relatively large value. If the electronic controller 64 determines that the engine load is relatively steady, the electronic controller 64 will set the desired throttle pressure reserve at a relatively small value. Once the electronic controller 64 has determined the desired throttle pressure reserve value, the electronic controller 64 compares that desired throttle pressure reserve value to the actual throttle pressure reserve which is determined as the difference between the upstream pressure signal in line 68 and the downstream pressure signal in line 72.

The electronic controller 64 outputs a wastegate control signal in line 78 to operate wastegate actuator 80 which controls the position of the wastegate valve 14. If the actual throttle pressure reserve is greater than the desired throttle pressure reserve value, the electronic controller 64 transmits a control signal in line 78 instructing the wastegate actuator 80 to open the position of the wastegate valve 14. If the actual throttle pressure reserve is less than the desired throttle pressure reserve value, the electronic controller 64 transmits a signal in line 78 instructing the wastegate actuator 80 to close the position of the wastegate valve 14.

The preferred scheme for adaptively generating the desired throttle pressure reserve value in the electronic controller 64 is illustrated schematically in FIG. 4. At engine start-up (time (t)=0), the desired throttle pressure reserve value, or $\Delta P$ set point, is typically about 13 inches of mercury, which corresponds to a typical desired throttle pressure reserve value for a fluctuating load. However, a different $\Delta P$ set point at engine start-up can be selected. The diagram in FIG. 4 indicates that after engine start-up (i.e. time (t=$\emptyset$), the desired throttle pressure reserve value will be continuously adapted in accordance with a loop-type scheme, unless the desired throttle pressure reserve value is adjusted for some other reason. For instance, fuel consumption at light loads can sometimes be relatively unimportant, so it may be desirable to fix the throttle pressure reserve value at a high value for light loads and use the adaptive scheme only for medium or high loads.

Block 82 illustrates that a desired throttle pressure reserve value is initially selected at time (t)=0. FIG. 4 indicates that the desired throttle pressure reserve value for each subsequent sampling period, block 84, is determined by subtracting a fixed or constant gain, block 86, and adding a proportional gain, block 88, and an integral gain, block 90, to the previous desired throttle pressure reserve value. The sampling rate for the electronic controller would typically be in the range of 10–50 Hz, however, the invention is not limited thereto.

It is preferred that the fixed gain, block 86, always be subtracted from the previous desired throttle pressure reserve value. Subtracting the fixed gain, block 86, will drive the desired throttle pressure reserve value downward, therefore improving engine efficiency, unless the proportional gain term, block 88, or the integral gain term, block 90, push the desired throttle pressure reserve upward when improved engine response is desired because of past or current load fluctuations.

Block 88 indicates that a proportional gain term is added to drive up the desired throttle pressure reserve value when the current load on the engine increases. The purpose of block 88 is to allow the desired throttle pressure reserve value to climb if the engine load increases. It may be desirable to place maximum limits on the increase of the desired throttle pressure reserve value to avoid surge problems that can occur when the load on the compressor 24 is relatively unstable. The proportional term, block 88, typically includes a term indicating the change in load multiplied by a proportional gain value. Block 90 indicates that an integral gain term is added to drive up the desired throttle pressure reserve if the load has been fluctuating historically over time.

The preferred way of carrying out the scheme shown in FIG. 4 involves the use of negative speed error as an indication of engine load. Negative speed error can be defined as the desired speed set point for the engine 10 less the actual speed of the engine 10. In electronic generator applications, the desired speed set point would typically be 60 Hz in the United States and 50 Hz in Europe. Negative speed error is an indication of engine load because the engine 10 will tend to slow down as load increases. Using negative speed error as a surrogate for engine load, the scheme in FIG. 4 can be carried out in accordance with the following equation (1):

$$\Delta P(t+1) = -\text{GAIN} + P*NSE + I*\int NSE + \Delta P(t)$$

where:

$\Delta P(t)$ = the desired throttle pressure reserve value for a current time period;

GAIN= a fixed value chosen to slowly drive the desired throttle pressure reserve value towards zero;

P= proportional gain term;

NSE= negative speed error (i.e. a preselected engine speed set point less the engine speed as measured by the engine speed sensor);

I= integral gain term;

$\int NSE$= integral of the negative speed error over a desired length of time in the past.

In applying equation (1), it is preferred that negative speed error (NSE) be set to zero when the actual engine speed is above the pre-selected engine speed set point. Using equation (1), the fixed gain term, block 86, will drive the desired throttle pressure reserve value lower and lower until the onset of difficulties with engine controllability due to fluctuating engine loads occurring with insufficient throttle pressure reserve. Of course, $\Delta P(t+\Delta)$ is never allowed to go below zero and preferably never allowed to go below a small positive value. Each of the gain terms in equation (1) (i.e. GAIN, P and I) can be selected relative to one another to determine the behavior of the control scheme. Preferably, the gains terms (GAIN, P, and I) will be chosen so that it will take the desired throttle pressure reserve value at least several minutes to recover after an aberration in load has occurred.

A dead band for the negative speed error can also be used by setting the negative speed error to zero if the actual engine speed is lower than the pre-selected engine speed set point by only a few rpm. Such a negative speed dead band will prevent unnecessary adjustment of the desired throttle pressure reserve value in circumstances where the engine speed drops only slightly for reasons not associated with the engine load such as spark plug misfires, etc.

FIGS. 5a through 5c illustrate graphically the response of the adaptive $\Delta P$ wastegate control to engine load changes. FIGS. 5b and 5c show that engine load torque changes at time =20 seconds indicated by point 92. This change in engine load at point 92 results in an undesirable engine speed change. At point 93, the engine load torque decreases, and the engine speed correspondingly increases. FIG. 5a shows the $\Delta P$ set point, or desired throttle pressure reserve value, begins changing at point 94 in response to both of the load changes 92 and 93. The desired throttle pressure reserve value ramps up to a sufficient value to maintain a constant engine speed indicated by reference numeral 95. After the load has held steady, the desired throttle pressure reserve is reduced to improve fuel consumption as depicted by reference numeral 96. Reducing the desired throttle pressure reserve value not only tends to improve fuel consumption, but can also reduce undesirable emissions that can occur during transient load changes.

It can therefore be appreciated that the control scheme described in FIGS. 4, and equation (1), not only takes into account the past load history on the engine, but also schedules the desired throttle pressure reserve value as a function of current changes in engine load.

After an extended period of time with no load changes, the wastegate will have been adjusted to provide for a very low throttle reserve. When an incipient load change occurs under these conditions, there will be very little throttle pressure reserve to accommodate the sudden load increase. To overcome this problem, it is preferred to apply transient enrichment of the fuel/air mixture entering the engine 10 when there is a sudden load increase after a period of extended load steadiness.

It is recognized that there may be various modifications, alternatives and equivalents to the invention as described. These modifications, alternatives or equivalents should be considered to fall within the scope of the following claims.

I claim:

1. A turbocharged internal combustion engine comprising:

an engine;

a turbocharger having a turbine and a compressor;

a throttle connected between the compressor and the engine;

an upstream pressure sensor sensing the pressure upstream of the throttle between the throttle and the compressor, the upstream pressure sensor generating an upstream pressure signal in response thereto;

a downstream pressure sensor sensing the pressure downstream of the throttle between the throttle and the engine, the downstream pressure sensor generating a downstream pressure signal in response thereto;

an engine load sensor that generates an engine load signal;

an electronic controller that inputs the upstream and downstream pressure signals and the engine load signal and outputs a wastegate control signal; and a wastegate connected between the engine and the turbine that diverts engine exhaust away from the turbine in response to the wastegate control signal;

wherein the wastegate control signal depends at least in part on a history of the engine load signals.

2. The invention as recited in claim 1 wherein the engine load sensor is an engine speed sensor, and the engine load signal is an engine speed signal.

3. The invention as recited in claim 2 wherein the engine speed sensor is an engine rpm sensor, and the engine speed signal is an engine rpm signal.

4. The invention as recited in claim 1 wherein the wastegate control signal further depends in part on the current engine load.

5. The invention as recited in claim 1 wherein the wastegate control signal is calculated on the basis of successive desired throttle pressure reserve values which depend at least in part on the previous engine load history.

6. The invention as recited in claim 3 wherein the successive throttle pressure reserve values further depend at least in part on a fixed negative gain that drives successive desired throttle pressure reserve values downward absent a significant fluctuation in engine load to drive the desired pressure reserve value upward.

7. The invention as recited in claim 4 wherein the successive throttle pressure reserve values further depend at least in part on the current engine load.

8. The invention as recited in claim 1 wherein the engine load sensor is an engine speed sensor, and the wastegate control signal is calculated on the basis of successive desired throttle pressure reserve values that are determined in the electronic controller in accordance with the following equation:

$$\Delta P(t+1) = -\text{GAIN} + P* NSE + I* \int NSE + \Delta P(t)$$

where:

$\Delta P(t)$ is the desired throttle pressure reserve value for a current time period;

$\Delta P(t+1)$ is the desired throttle pressure reserve for the next subsequent time period;

GAIN is the fixed value chosen to slowly drive the desired throttle pressure reserve towards zero absent a significant fluctuation in engine load;

P is a proportional gain;

NSE is negative speed error which is equal to a pre-selected engine speed set point less the engine speed as measured by the engine speed sensor during the current time period, unless the engine speed as measured by the engine speed sensor during the current time period is quicker than the pre-selected engine speed set point in which case NSE is equal to 0;

I is an integral gain; and

∫NSE is the integral of the negative speed error over a desired length of time in the past.

9. The invention as recited in claim 1 wherein the wastegate control signal depends on a history of the engine load only when the current engine load is greater than 25% of maximum engine rated load.

10. The invention as recited in claim 1 wherein the engine drives an electric generator, and the engine load sensor is an electrical sensor monitoring the electrical output of the generator.

11. The invention as recited in claim 1 wherein the engine load sensor is a MAP sensor measuring the intake manifold absolute pressure, and generating the engine load signal in response thereto.

12. A control system for a wastegate valve in a turbocharged internal combustion engine comprising:

means for measuring a pressure upstream of a throttle in the engine, and generating an upstream pressure signal in response thereto;

means for measuring a pressure downstream of the throttle, and generating a downstream pressure signal in response thereto;

means for measuring engine load and generating an engine load signal in response thereto;

an electronic controller that inputs the upstream pressure signal, the downstream pressure signal, and the engine load signal, and outputs a wastegate control signal, the electronic controller adaptively generating a desired throttle pressure reserve value; and a wastegate actuator that adjusts the wastegate valve in response to the wastegate control signal;

wherein the wastegate valve is opened when a difference between the value of the upstream pressure signal and the value of the downstream pressure signal exceeds the adaptively generated desired throttle pressure reserve value, and the wastegate valve is closed when the difference between the value of the upstream pressure signal and the value of the downstream pressure signal is less than the adaptively generated desired throttle pressure reserve value.

13. The invention as recited in claim 12 wherein engine speed is measured as a surrogate for engine load, and the desired throttle pressure reserve value is adaptively generated for successive time periods in accordance with the following equation:

$$\Delta P(t+1) = -GAIN + P^* NSE + I^* \int NSE + \Delta P(t)$$

where:

$\Delta P(t)$ is the desired throttle pressure reserve value for a current time period;

$\Delta P(t+1)$ is the desired throttle pressure reserve for the next subsequent time period;

GAIN is the fixed value chosen to slowly drive the desired throttle pressure reserve towards zero absent a significant fluctuation in engine load;

P is a proportional gain;

NSE is negative speed error which is equal to a pre-selected engine speed set point less the engine speed as measured by the engine speed sensor during the current time period, unless the engine speed as measured by the engine speed sensor during the current time period is greater than the pre-selected engine speed in which case NSE is equal to 0;

I is an integral gain; and

∫NSE is the integral of the negative speed error over a desired length of time in the past.

14. The invention as recited in claim 13 wherein the negative speed error is calculated to account for a dead band in which the negative speed error is set equal to zero as long as the engine speed as measured by the engine speed sensor is not significantly less than the pre-selected engine speed set point.

15. In an internal combustion engine having a turbocharger and a wastegate valve, a method of controlling the position of the wastegate valve comprising the steps of:

measuring a pressure difference across a throttle in the engine;

measuring load on the engine repeatedly over time;

adaptively generating a desired throttle pressure reserve value;

comparing the measured pressure difference across the throttle with the desired throttle pressure reserve, and electronically generating a wastegate control signal in response thereto; and using the wastegate control signal to control a wastegate actuator to open the wastegate valve when the measured pressure difference across the throttle is greater than the desired throttle pressure reserve, and to close the wastegate valve when the measured pressure difference across the throttle is less than the desired throttle pressure reserve.

16. The method as recited in claim 15 wherein the adaptively generated desired throttle pressure reserve value depends at least in part on a history of the engine load signals.

17. The method as recited in claim 16 wherein the adaptively generated desired throttle pressure reserve value also depends at least in part on a constant negative gain that drives successive desired throttle pressure reserve values downward absent a significant fluctuation in engine load to drive the desired throttle pressure reserve value upward.

18. The invention as recited in claim 15 wherein engine speed is measured as a surrogate for engine load, and the desired throttle pressure reserve value is adaptively generated for successive time periods in accordance with the following equation:

$$\Delta P(t+1) = -GAIN + P^* NSE + I^* \int NSE + \Delta P(t)$$

where:

$\Delta P(t)$ is the desired throttle pressure reserve value for a current time period;

$\Delta P(t+1)$ is the desired throttle pressure reserve for the next subsequent time period;

GAIN is the fixed value chosen to slowly drive the desired throttle pressure reserve towards zero about a significant fluctuation in engine load;

P is a proportional gain;

NSE is negative speed error which is equal to a pre-selected engine speed set point less the engine speed as measured by the engine speed sensor during the current time period, unless the engine speed as measured by the engine speed sensor during the current time period is greater than the pre-selected engine speed in which case NSE is equal to 0;

I is an integral gain; and

∫NSE is the integral of the negative speed error over a desired length of time in the past.

19. The method as recited in claim 15 wherein successive desired throttle pressure reserve values are adaptively generated with a loop update scheme.

20. The method as recited in claim 15 wherein successive desired throttle pressure reserve values are adaptively generated, and the magnitude of an increase of the desired throttle pressure reserve value between two successive generations is limited to a pre-selected valve.

21. The method as recited in claim 16 further comprising the step of providing transient enrichment of the fuel/air mixture entering the engine at the inception of a local increase after a period of extended load steadiness.

* * * * *